Nov. 11, 1930.　　　W. T. BLANEY　　　1,781,430
AIR CLEANER
Filed June 19, 1926　　5 Sheets-Sheet 1

Inventor
William T. Blaney

Nov. 11, 1930. W. T. BLANEY 1,781,430
AIR CLEANER
Filed June 19, 1926 5 Sheets-Sheet 3

Inventor
William T. Blaney

Nov. 11, 1930.  W. T. BLANEY  1,781,430
AIR CLEANER
Filed June 19, 1926   5 Sheets-Sheet 5

Inventor
William T. Blaney

Patented Nov. 11, 1930

1,781,430

UNITED STATES PATENT OFFICE

WILLIAM T. BLANEY, OF PETERBOROUGH, ONTARIO, CANADA

AIR CLEANER

Application filed June 19, 1926. Serial No. 117,087.

This invention relates to air cleaners, and particularly relates to devices such as are employed in cereal mills, wood working plants, and in various other industries, for continuously cleaning a large flow of air.

It is an object of the invention to provide an apparatus particularly adapted for continuously filtering out light particles of clinging material from a considerable volume of flowing air, and to overcome the tendency of such an apparatus toward clogging of the filter elements due to the peculiar characteristics of such particles.

Another object of the invention is to provide an air cleaner comprising grouped filter elements for separating dust and the like from a current of air, and comprising means successively acting upon the groups of filter elements to agitate the same and thereby shake loose adhering dust.

Still another object of the invention is to effect a periodic step-by-step rotational travel of a support for a plurality of grouped filter elements, and to successively agitate the groups of said elements by a means arranged to act thereupon at a certain point in their rotary path.

A further object is to provide a plurality of grouped filter elements co-acting to continuously remove dust from a current of air, and to successively discontinue the air supply to each group of said elements while the remaining elements continue to exercise their cleaning function, the filter elements being agitated during their inactive periods to relieve them of dust accumulations.

A still further object is to mount hammers or the like for agitating the filter elements upon a rotative support carrying said elements, and to provide actuating means for said hammers fixed with respect to rotation of said support and adapted by rotation of the support to act upon said hammers successively to clean groups of the filter elements in succession.

These and various other objects the invention attains by the construction hereinafter described, and illustrated in the accompanying drawings, wherein:

Figure 1 is a view of the lower portion of the air cleaner in front elevation.

In these views the reference character 1 designates the cylindrical upper portion of a sheet metal casing, the lower portion 2 of which is substantially funnel-shaped. Air to be cleaned is adapted to be delivered in a substantially tangential direction to the portion 1 of said casing through a supply pipe 3 and the top 4 of said casing is centrally formed with a circular opening 4ª through which filtered air is adapted to discharge from the casing. In said opening there is mounted a rotary member comprising a ring 6 and a plurality of arms 7 integrally connecting said ring to a central hub 8.

Within the portion 1 of said casing there is mounted for rotation about the casing axis, a cylindrical sheet metal drum 9 spaced from said casing to form an annular air passage 10, and having a cover 10$^a$ extending slightly below the casing top 4 from the side wall of said drum to the ring 6 and rigidly secured to said ring.

Within the upper portion of said drum there is formed a clean air chamber 10$^b$ to which filtered air is adapted to be delivered by a plurality of fabric filter tubes 11, upwardly extending from the lower end of the drum. Said tubes are arranged in groups each occupying a segmental space within the drum, eight of such groups being provided in the illustrated embodiment of the invention. The drum is reinforced at its lower end by a frame formed by a ring 13 and radial T-bars 13$^a$ and the bottom of the drum is closed by segmental plates 14 formed preferably of wood, secured beneath the radial bars 13$^a$, and each provided with a plurality of openings 15 within which the lower ends of the tubes 11 are secured by split spring rings 16. The upper ends of the tubes 11 are closed by discs 17 formed of wood or other suitable material which are inserted in said ends and are held in position by split spring rings 18 embracing the tubes and said discs. Just below the clean air chamber 10$^b$ and in substantially the plane of the upper ends of the tubes 11, the drum is interiorly reinforced by a frame comprising a ring 18$^a$ and a plurality of T-bars 18$^b$ extending radially inward from said ring and secured at their inner ends to a hub member 18$^c$.

The upper ends of each group of tubes are adapted to undergo a limited vertical movement in unison to agitate the tubes of the group for the purpose of shaking loose accumulations of dust. For this purpose there is mounted between each adjacent pair of radial bars 18$^b$ a floating segmental frame 19, 20 formed preferably of angle bars. Said frames each comprise a pair of radial elements 19 spanned by a plurality of arcuate metal bars 20 terminally rigidly secured to said radial members, and to said bars 20 are bolted, as indicated at 21, the closure discs 17 of a group of underlying filter tubes. Thus it is seen that each of the frames 19, 20 forms a mounting for the upper ends of the filter tubes comprising one of said groups.

Figure 2:
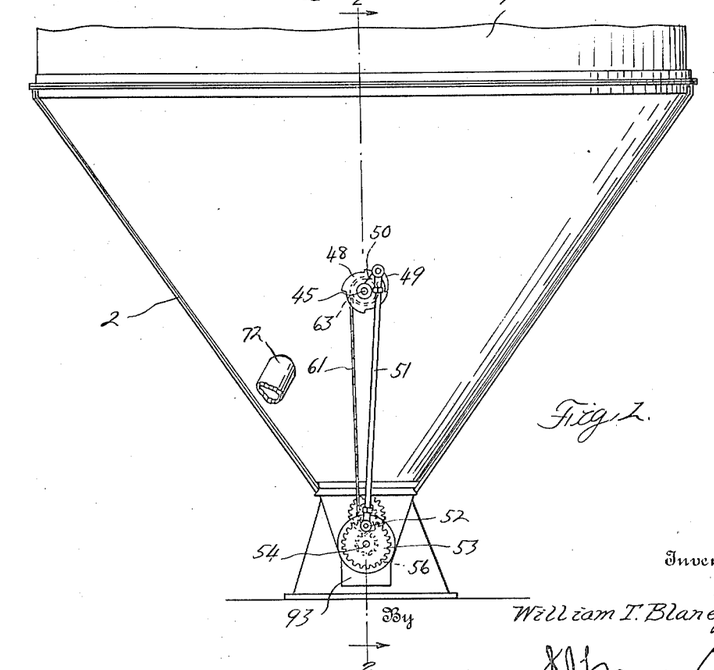
Figure 2 is a view of the same in sectional elevation taken in part upon the line 2—2 of Figure 1.
Figures 3, 6, 7:
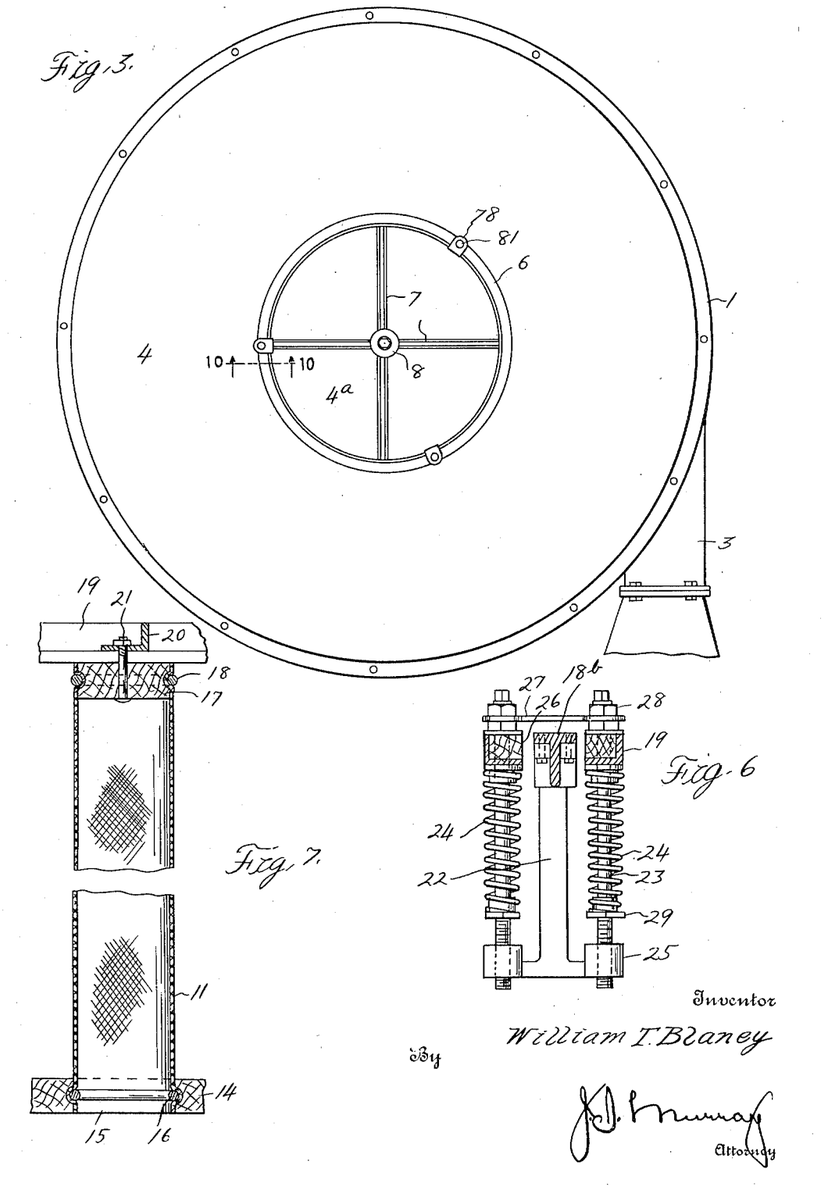
Figure 3 is a plan view of the cleaner.
Figure 6 is a vertical sectional view taken upon the line 6—6 of Figure 4, and showing the yielding means mounting the supporting frame for the upper ends of the filter tubes.
Figure 7 is an enlarged side view of one of the filter tubes showing how its ends are carried.
Figure 4:
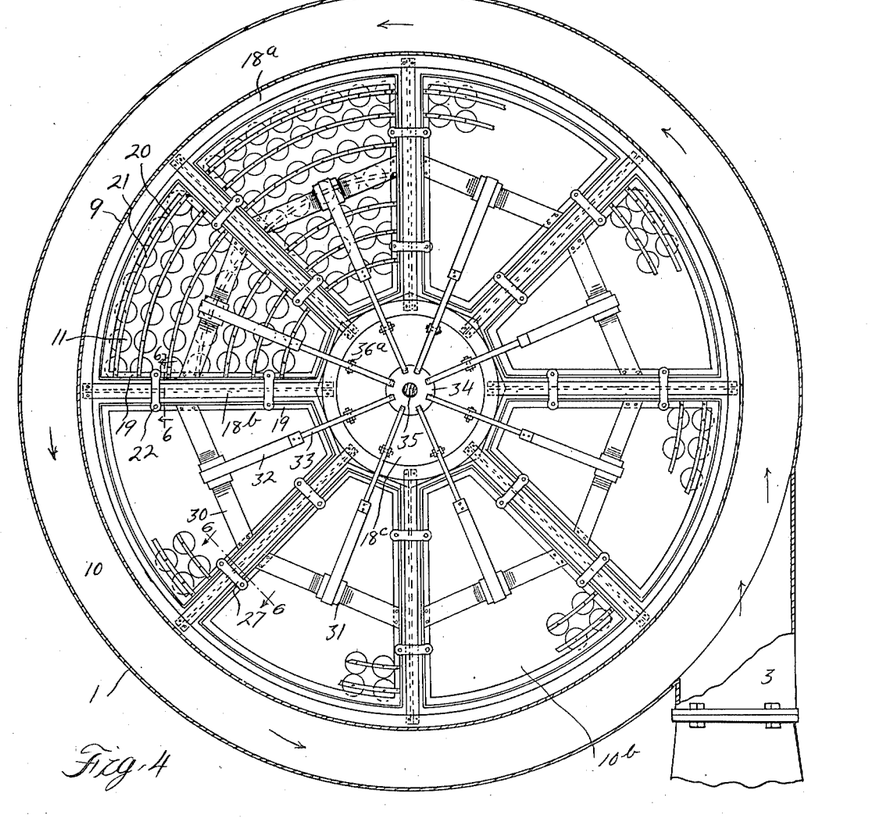
Figure 4 is a cross-sectional view taken upon the line 4—4 of Figure 2.

To each of the upper radial bars 18$^b$ are bolted two spaced hangers 22 of inverted T-shape, and each of said hangers mounts a pair of coiled springs 24, arranged one at each side of the hanger stem or shank and serving as yieldable supports for the two frames 19, 20 between which said hanger is arranged. Preferably said springs embrace a pair of guide rods 23, the lower ends of which have screw-threaded engagement with enlargements 25 formed terminally upon the horizontal portion of each hanger. These rods project upwardly beyond the adjacent bar 18$^b$, passing freely through the members 19 at each side of said bar, and through filler blocks 26 carried by said members. Above the members 19, the paired rods 23 are joined by a flat bar 27 terminally mounted fast upon said rods by lock-nuts 28. The springs 24 exert an up-thrust upon the members 19 holding the latter normally engaged with the bars 27, and abutments 29 for the lower ends of the springs are threaded upon the lower portions of the rods 23 and locked in place on said rods. The upper ends of the rods 23 are squared for engagement by a tool for rotating said rods to raise or lower them with respect to the enlargements 25. Such an adjustment together with a vertical adjustment of the bar 27 will vary the compression of the springs 24.

The radial members 19 of each frame 19, 20 are bridged by an anvil bar 30 extending across the center of said frame, and the head 31 of a hammer 31, 32, 33 is adapted to descend centrally upon said anvil bar. The arms or shanks 32, 33 of said hammers are arranged above the filter tubes and radiate from the axis of the drum 9, and each of said arms comprises the resilient outer portion 32 and the rigid inner portion 33. A common pivotal support for the inner ends of all of said hammer arms is formed by a collar 34 mounted upon a vertical shaft 35 rigidly and centrally connecting the hub member 18$^c$ to the hub 8 of the top journal member of the drum.

With each hammer 31, 32, 33, there is associated an elongated vertical actuating rod 36, said rods being pivoted at their upper ends to the rigid inner parts 33 of the hammer arms as indicated at 36$^a$, and extending downwardly through a sheet metal cylinder 37 which rigidly connects the hub plate 18$^c$ and a corresponding hub plate 38 at the lower end of the drum. Said rods pass slideably through the latter plate and are terminally provided with impact heads 39, some distance below the drum. Slightly above said heads the rods engage a common slide bearing or guide member formed by a disc 40 centrally mounted fast upon a vertical shaft 41, said disc having in its outer portion openings 42 receiving said rods.

The shaft 41 both supports and drives the drum 9, the upper end of said shaft being rigidly mounted in the lower hub plate 38 of the drum. The lower portion of said shaft seats in a thrust bearing member 43 mounted upon a pair of spaced channel beams 44 carried by and within the portion 2 of the casing. A horizontal shaft 45 having a drive connection to the shaft 41 through a pair of bevel gears 46 is journaled at its inner end in the bearing member 43 and is further journaled in a bearing 47 mounted in the front wall of the portion 2 of the casing. Forwardly of the casing, the shaft 45 rigidly carries a ratchet wheel 48, engaged by a pawl 49 for effecting a step-by-step drive of said shaft. Said pawl is pivoted upon the outer end of an arm 50 loosely mounted upon the shaft, and a pitman 51 for rocking said arm extends from the latter downwardly to engage a crank pin 52 upon a gear 53. This gear is freely mounted upon the front end of the shaft 54 of a spiral conveyor 55 extending within a trough 56 which closes the lower end of the casing member 2. It is to be understood that said conveyor shaft is continuously driven by any suitable means (not shown). The gear 53 is driven from the conveyor shaft through speed reduction gears 57, 58 and 59. The two last mentioned gears are joined to rotate as a unit upon a stationary stub shaft 60 mounted above the conveyor shaft.

Describing now a mechanism for intermittently actuating the hammers 31, 32, 33 in definitely timed relation to rotation of the drum 9, 61 is an endless chain driven by a sprocket wheel 62 secured to the gear 53 and driving a sprocket wheel 63 fast upon the outer end of a tubular shaft 64 which surrounds the shaft 45. Upon the inner end of said tubular shaft there is mounted fast a cam 65 having three similar adjacent teeth 66 each having a radial face and an arcuate face. (See Figure 8.) These teeth occupy substantially one half of the periphery of the cam and the remaining half of said periphery forms a substantially spiral curve of minimum radius at the base of the radial side of one of the teeth 66 and having a maximum radius equal to that of said teeth at its intersection with a radial shoulder 67 extending to the base of the curved face of another of said teeth. Upon said cam bears the lower end of a plunger 68 vertically slidable in bearings 69 and a head 70 fast upon the upper end of said plunger projects in such manner that the impact heads 39 will be successively positioned just above said head 70 through rotation of the drum 9.

Figure 9:
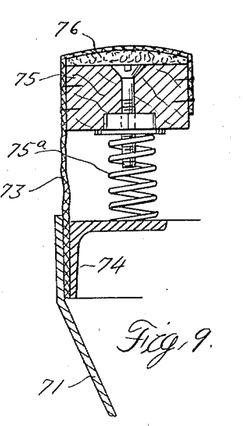
Figure 9 is a vertical sectional detail on line 9—9 of Figure 5 showing the upper portion of a dust receiver arranged beneath the rotative drum and having air sealed engagement with the drum.

Between the plunger 68 and the front wall of the casing, a substantially funnel-shaped dust receiver 71 is mounted, the reduced lower end of which has a discharge pipe 72 leading therefrom downwardly at an inclination toward the front wall of the casing, said pipe passing through said wall in air-sealed relation thereto, and thence extending to any desired point of dust discharge. The upper end of said receiver is of a segmental form conforming to that of the bottom plates 14 of the drum and bears upon the bottom surface of said plates registering with the latter successively through rotation of the drum. It is desirable to establish an air seal between said receiver and the drum bottom, and this may be accomplished by forming the upper marginal portion 73 of said receiver of a strip of canvas or like flexible material, the lower edge of said strip being clamped between angle bars 74 and the body of the receiver, and the upper edge of said strip being secured to a frame 75 formed preferably of wooden bars, said frame being upwardly urged by a plurality of springs 75ª coiled between said frame and the bars 74. Preferably the top or bearing face of the frame 75 is padded as indicated at 76.

Figures 5, 8, 10:
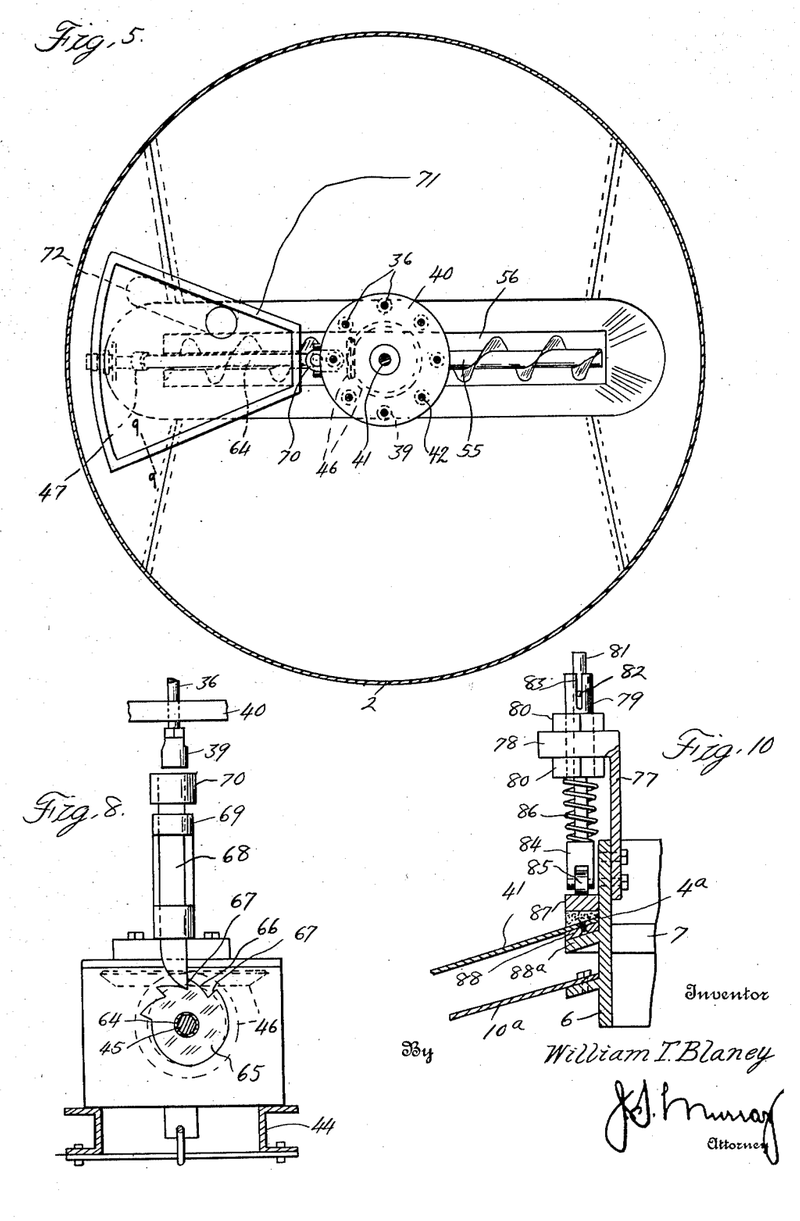
Figure 5 is a cross-section view taken upon the line 5—5 of Figure 2, and showing primarily the drive mechanism for the filter tube support, and the hammer actuating mechanism.
Figure 8 is a vertical sectional view taken on the line 8—8 of Figure 2 showing a portion of the hammer actuating mechanism.
Figure 10 is a cross-section taken on the line 10—10 of Figure 3 and showing means for maintaining an air seal between the casing top and a journal member for the upper end of the drum mounted in said top.

It is desirable also to maintain an air sealing engagement between the top 4 of the casing and the member 6, 7, 8 which journals the drum in said top. Such an engagement is established, as is best seen in Figure 10, by mounting fast upon the ring 6 a plurality of spaced upstanding brackets 77 each having at its upper end an outwardly projecting enlargement 78 which rigidly mounts a vertical sleeve 79 clamped to said enlargement by lock-nuts 80 and vertically adjustable by means of said lock-nuts. In each sleeve 79 a rod 81 is free for vertical movement but is held from rotation by a pin 82 projecting from its upper portion into a vertical slot 83 in the upper portion of the sleeve. The lower end of each rod 81 is headed as indicated at 84 to journal a roller 85 and a spring 86 upon the lower portion of each rod is compressed between the head 84 and the lower lock-nut 80, subjecting the rod to downward pressure. The several rollers 85 bear upon a metal ring 87 resting upon the top 4 around its opening 4ª thereby exerting a downward pressure upon the top. To the lower face of the top is secured a bearing ring 88 formed preferably of wood which is firmly seated through the pressure applied by said rollers upon a flange 88ª outstanding from the ring 6.

Figure 11:
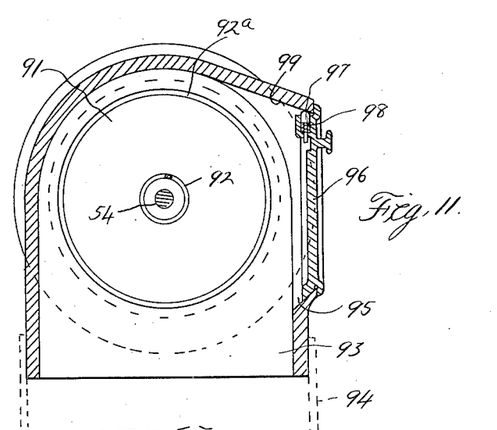
Figure 11 is a detail vertical section on line 11—11 of Figure 2 showing the passage through which dust is discharged, and particularly showing an emergency provision for the discharge of dust.

The trough 56 has at one end thereof an outlet 90 into a dust discharge passage 91 and the conveyor shaft 54 extends through said passage and mounts therein a coiled spring 92 holding a disc-shaped closure 92ª, slidable on said shaft, normally in a position to close the opening 90. Dust is delivered by the conveyor to the outlet and is packed by the conveyor against said closure until a sufficient pressure is created to overcome the spring 92, whereupon the dust discharges into the passage 91 whence it escapes through an outlet 93. 94 designates a pipe connected to the outlet 93 for carrying off the dust.

In view of the possibility that, through inadvertence or carelessness, dust may be allowed to clog the pipe 94 and accumulate in the passage 91, it is desirable to provide an outlet from said chamber for emergency use. Such an outlet is indicated at 95, and 96 designates a closure normally applied to said outlet. Said closure is at one end hooked to engage a corresponding margin of the opening 95 and its other end carries a latch 97 adapted to bear under pressure of a spring 98 upon a beveled edge face 99 of said opening. Outward pressure of dust against said closure is adapted to overcome the spring 98, and throw said closure clear of the opening so that the dust may discharge upon the floor on which the machine is set up.

In the operation of the described apparatus, the tangential direction of air admission to the space 10 causes a whirling of the air in said space and gives the dust particles a centrifugal impetus against the outer wall of the casing. The air in discharging downwardly from said space flows beneath the drum to enter the filter tubes 11 through the openings 15 in the bottom of the drum. In thus flowing away from the casing wall, the air leaves the heavier dust particles free to slide down said wall into the portion 2 of the casing, to lodge finally in the trough 56 in which the spiral conveyor 55 is operating.

The air entering the filter tubes will carry dust of a light nature which will be deposited upon the inner faces of the filter tubes as the air escapes through the walls of said tubes. The closures 17 prohibit any escape of air from the filter tubes through their upper ends. The cleaned air which has passed through the filter tubes rises into the clean air chamber 10$^b$ from which it discharges to the external atmosphere through the openings of the journal member 6, 7, 8. The total discharge area of said openings is such as to maintain a certain amount of pressure in the clean air chamber, and in the space surrounding the filter tubes which pressure prevents the air from passing through the filter tubes too freely and consequently increases the effect of said tubes in relieving the air of entrained dust.

The filter tubes would soon become so clogged with dust as to detract greatly from their efficiency were it not for the described provision for periodically shaking loose the dust accumulations. In air filters of the described type, there has always been heretofore considerable trouble in maintaining the fabric filter elements sufficiently clean to permit the apparatus to properly function. The present invention, by providing a great number of filter tubes and by thoroughly agitating these tubes in groups at regular intervals, completely eliminates such trouble. It will be observed that the teeth of the ratchet wheel 48 are spaced apart, and that the rocking movement of the arm 50 is very gradual. The effect of this is to leave the drum 9 stationary for a period of several minutes after each rotative advance, and it is during these intermissions of rest that the cleaning operation is performed. As has been explained, the groups of filter tubes successively register with the dust receiver 71 during the periods of rest of the drum and the hammer actuating plunger 68 is so located with respect to said dust receiver that it will act upon the particular hammer 31, 32, 33 which is effective upon the group of tubes registering with said receiver. The timed relation between the hammer actuating mechanism and the drum rotating mechanism is such that the toothed portion of the cam 65 acts upon the plunger 68 during the period of rest of the drum while the spirally curved surface of the cam engages said plunger during a period of travel of the drum. Thus as the drum advances the plunger 68 is being raised, and during a rest period of the drum, said plunger is raised four times and is allowed to abruptly drop after each elevation. These movements of said plunger are communicated to the overlying actuating rod 36 and from the latter to the hammer 31, 32, 33 engaged by said rod so that said hammer strikes four successive blows upon the anvil bar 30 controlling the group of tubes above the dust receiver 71. Each stroke of the hammer effects a depression of the floating frame 19, 20 and a consequent slackening of all of the tubes 11 connected to said frame. The springs 23 immediately act to again elevate the frame 19, 20 and extend the filter tubes. Thus each hammer blow is doubly effective in releasing dust from the filter tubes of the group effected by said blow since both the abrupt slackening of the tubes and the quick subsequent extension thereof are highly effective in freeing dust from the tubes.

In this connection it is important to note that since the receiver 71 has an air sealed engagement with the drum there is a cessation of air pressure within the group of tubes which is being cleaned so that the resistance to release of the dust which would result from such pressure is avoided. It is furthermore important to note that owing to the maintenance of a slightly super-atmospheric pressure of air in the space surrounding the filter tubes, there is produced a slight back flow of air through the walls of said tubes during the cleaning operation, which flow materially supplements the agitation produced by the hammer in releasing dust from the interior surfaces of the tubes.

While the described arrangement is such as to render one group of the filter tubes (or an equivalent number thereof) constantly out of operation to permit cleaning thereof, the remaining filter tubes are sufficiently numerous to adequately handle the delivered air at all times.

The construction is one requiring very little applied power, and the mechanism is capable of operating over a long period of time without lubrication or other attention.

A desirable feature of the construction is the maintenance of a tight air seal between the top of the casing and the rotating journal member 6, 7, 8, and also the provision for discharging both the coarse dust which settles into the trough 56 and the relatively fine dust released from the tubes 11 without any appreciable escape of air from the casing.

What I claim is:

1. An air cleaner comprising a plurality of air filtering units, a rotative support for said units, means for delivering dust-laden air to said units, a plurality of hammers pivoted upon said support, and adapted to respectively act upon said units, means for effecting an intermittent step-by-step rotation of said support, and a common actuating means for said hammers adapted to successively act upon said hammers through their rotation with said support.

2. An air cleaner comprising a rotative support, means for rotatively actuating said support, a plurality of tubular filter members grouped upon said support, and extending substantially parallel to the axis of rotation of said support, means for delivering dust-laden air to said filter members, a mounting engaged by corresponding ends of the filter members of each group adapted for a limited movement lengthwise of said filter members, impact members mounted upon said support and successively acting upon the movable end mountings of the groups of filter members, and means for actuating said impact members in succession and in a definite position of the rotary travel of said support.

3. An air cleaner comprising a rotary support, a drum mounted upon said support and rotative therewith, a plurality of filter members extending upon said support and within said drum substantially parallel to the axis of rotation of said support, means for delivering dust-laden air to said filter members at one end of the support, means for closing the other ends of said filter members, means for intermittently effecting a step-by-step rotative travel of said support, and means for agitating said filter members, successively taking effect in a definite rotative position of said support during its intermissions of rest, said drum having an air outlet sufficiently restricted to maintain a super-atmospheric pressure in the drum around the filter members.

4. An air cleaner comprising a rotative support, a drum mounted upon said support having a substantially central opening therein, a plurality of filter members arranged in groups in a circular series within said drum, means for effecting an intermittent step-by-step rotation of said drum, means for delivering dust-laden air to said filter members through one end of said drum, agitators for said groups of filter members mounted upon the upper portion of said drum, control elements for said agitators extending through the central opening of the drum, and means arranged beneath the drum acting successively upon said control elements through the rotative advance of said support to effect a successive actuation of said agitators in a definite position or rotation of said support.

5. An air cleaner comprising a casing having an inlet for dust laden air, a support rotative within said casing, a plurality of filter members carried by said support, means for rotatively actuating said support, means within said casing for agitating said filter members successively in a definite position of rotation of said support, the top of said casing being spaced above said filter members to form a purified air chamber, and a member journaling said support in the upper end of said casing formed with outlets for the purified air.

6. An air cleaner comprising a cylindrical casing, having a top formed with a central opening, a drum rotatable in said casing and forming with the casing an annular air passage, said drum having a top adjacent to the top of said casing, a member secured to the drum and rotatable with the drum in said opening of the casing top, said member having a provision for the discharge of filtered air from the drum, air filtering means within the drum spaced from the top of the drum to form a filtered air chamber, and means for tangentially delivering dust laden air to said annular passage, the casing being formed with a chamber below the drum providing for a flow of air from said annular passage to said filter means through the bottom of the drum.

7. An air cleaner comprising a casing having a top and a substantially central opening in said top, a drum rotatable in the casing, and forming with the casing an annular air passage, said drum having a top adjacent to the top of the casing, a member secured to the drum, and rotatable with the drum in said opening of the casing top said member having a provision for the discharge of filtered air from the drum, an annular projection upon said member forming a seat for the casing top, means carried by said rotatable member yieldably pressing the casing top into sealing engagement with said annular flange, air filter means within the drum spaced from the top of the drum to form a filtered air chamber, and means for tangentially delivering dust laden air to said annular passage, the casing being formed with a chamber below the drum providing for an air flow from said annular passage to said filter means through the bottom of said drum.

8. The combination with two groups of collapsible filter members having spaced ends, of individual anchorage members for corresponding ends of said groups, a pair of springs acting one on each of said anchorage members to normally resist collapse of said tubes, a common mounting for said springs disposed substantially between said groups, and means carried by said mounting limiting the response of both anchorage members to said springs, and thereby relieving said tubes of the limiting stress of said springs.

9. The combination with two groups of collapsible filter members having spaced ends, of individual anchorage members for corresponding ends of said groups, a member arranged substantially between said anchorage members fixed with respect to collapse of the tubes, a bracket carried by said member projecting between the two groups of tubes, a pair of springs mounted on said bracket, and acting one on each of said anchorage members to normally resist collapse of said tubes, and means carried by said bracket extending across said fixed member and limiting response of both anchorage members to said springs and thereby relieving said tubes of the limiting stress of said springs.

10. An air cleaner comprising a rotative support, a plurality of flexible filter members extended upon said support substantially in the direction of its axis of rotation and grouped about said axis, means for delivering dust laden air to said filter members, anchorage members for said filter members yieldable in the direction of said axis, and each engaged by one group of said filter members, a plurality of hammers arranged radially to the axis of said support and engageable individually with said anchorage members, an actuating element for said hammers stationary with respect to rotation of said support, and means for rotating said support step-by-step through a distance such as to subject said hammers successively to said actuating member.

11. An air cleaner comprising a plurality of filter members arranged in groups about an axis and having ends spaced in the direction of said axis, means for delivering dust laden air to corresponding ends of said filter members, means for successively cutting off the air supply to said groups, anchorage members for the other ends of said filter members yieldable in the direction of said axis, and each engaged by one group of said filter members, a plurality of hammers arranged radially to said axis, and respectively in permanent operative association with the respective anchorage members, individual actuating members for said hammers arranged between said axis and the groups of filter members, and means arranged adjacent to the air receiving ends of said filter tubes for successively engaging said actuating members to effect an actuation of each hammer while the air supply is cut off from the group of tubes with which said hammer is associated.

12. An air cleaner comprising a plurality of filter members elongated substantially vertically, a rotative support for said members, means for actuating said support rotatively about a substantially vertical axis, agitating means for said filter members carried by said support above the filter members, an actuating element for said agitating means disposed below said support, and means extending through said support and acted upon by said element to subject said filter members successively to said agitating means through rotation of said support.

13. In a device of the character described, the combination with a cylindrical casing having an air outlet in its top portion, and having a substantially tangential air inlet, a drum journaled in said casing and forming therewith an annular passage into which said air inlet opens, means establishing an annular seal between said drum and casing substantially preventing air flow above the drum to said outlet from said passage, the casing having a chamber underlying the drum receiving air from said passage, a plurality of elements carried in a circular series by the drum for filtering air flowing from said chamber to said outlet, means for periodically agitating said elements responsive to rotation of the drum, and mechanism for rotating the drum.

14. In a device as set forth by claim 13, means for cutting off the delivery of air to each filter element during its agitation.

15. In a device as set forth by claim 13, means in the lower portion of the chamber underlying the drum for continuously discharging accumulated dust from said chamber.

16. In a device of the character described, the combination with a cylindrical casing having an air outlet in its top portion, and having a substantially tangential air inlet, a drum journaled in the casing and forming therewith a substantially annular passage into which said air inlet opens, a plurality of filter tubes carried by the drum in a circular series centered in the axis of rotation of the drum, the casing being formed with a chamber underlying the drum placing said annular passage in communication with said filter tubes, said tubes being closed at their upper ends, means establishing an annular seal between said casing and drum, substantially preventing air flow from said passage to said outlet except through said filter tubes, means acting upon their upper ends for agitating said tubes, periodically effective upon the tubes through rotation of the drum, and mechanism for rotating the drum.

17. In a device of the character described, the combination with a cylindrical casing having a substantially tangential air inlet, a drum journaled in said casing and forming therewith an annular passage into which said air inlet opens, the casing being formed at one end of the drum with a chamber communicating with said annular passage, and an air outlet being formed in the casing adjacent to the other end of the drum, means carried by the drum for filtering air flowing to said outlet from said chamber, means for rotating the drum, and agitating means for said filtering means effective upon the latter in one position of rotation of the drum.

In testimony whereof I sign this specification.

WILLIAM T. BLANEY.